(12) United States Patent
Lombard et al.

(10) Patent No.: US 9,932,886 B2
(45) Date of Patent: Apr. 3, 2018

(54) TURBOCHARGER WITH ROTARY BYPASS VALVE OPERABLE TO SELECTIVELY CONFIGURE THE TURBINE VOLUTE AS SINGLE-SCROLL OR TWIN-SCROLL

(71) Applicant: Honeywell International Inc., Morris Plains, NJ (US)

(72) Inventors: Alain Lombard, Vosges (FR); Lionel Toussaint, Vosges (FR); Chris Groves, Domevre sur Durbion (FR); Aurelien Tingaud, Thaon les Vosges (FR)

(73) Assignee: Honeywell International Inc., Morris Plains, NJ (US)

( * ) Notice: Subject to any disclaimer, the term of this patent is extended or adjusted under 35 U.S.C. 154(b) by 84 days.

(21) Appl. No.: 15/046,265

(22) Filed: Feb. 17, 2016

(65) Prior Publication Data

US 2017/0234212 A1   Aug. 17, 2017

(51) Int. Cl.
| | |
|---|---|
| *F01D 25/24* | (2006.01) |
| *F01D 5/02* | (2006.01) |
| *F02B 37/02* | (2006.01) |
| *F02B 37/18* | (2006.01) |
| *F02B 37/22* | (2006.01) |
| *F04D 29/28* | (2006.01) |
| *F02C 6/12* | (2006.01) |

(52) U.S. Cl.
CPC ............... *F02B 37/22* (2013.01); *F01D 5/02* (2013.01); *F01D 25/24* (2013.01); *F02B 37/025* (2013.01); *F02B 37/186* (2013.01); *F02C 6/12* (2013.01); *F05D 2220/40* (2013.01); *F05D 2260/606* (2013.01); *Y02T 10/144* (2013.01)

(58) Field of Classification Search
CPC ...... F01D 17/141; F01D 9/026; F01D 17/105; F02B 37/183; F02C 6/12; F05D 2220/40; F05D 2250/411
See application file for complete search history.

(56) References Cited

U.S. PATENT DOCUMENTS

| | | |
|---|---|---|
| 3,423,926 A | 1/1969 | Nancarrow et al. |
| 5,943,864 A | 8/1999 | Sumser et al. |
| 7,934,379 B2 | 5/2011 | Kuspert et al. |
| 8,353,664 B2 | 1/2013 | Lombard et al. |

(Continued)

FOREIGN PATENT DOCUMENTS

| | | |
|---|---|---|
| EP | 2463483 A2 | 6/2012 |
| EP | 2818666 A2 | 12/2014 |
| EP | 2921653 A1 | 9/2015 |

*Primary Examiner* — Brandon Lee
(74) *Attorney, Agent, or Firm* — John C. James

(57) ABSTRACT

A turbocharger has an annular bypass valve disposed in an annular portion of a bypass passage of the turbine housing. The turbine housing defines an exhaust gas chamber having separate half-annular first and second scrolls, and a portion of the bypass passage is sector-divided by a pair of dividing walls that create two 180-degree bypass sectors respectively connected to the first and second scrolls. Each dividing wall has a through-hole. The valve rotor defines a pair of valve members that close the through-holes when the bypass valve is fully closed. When the valve rotor begins to rotate toward an open position, first the valve members open the through-holes to connect the two bypass sectors, and then the bypass flow passages begin to open.

4 Claims, 9 Drawing Sheets

(56) References Cited

U.S. PATENT DOCUMENTS

2008/0038110 A1* 2/2008 Roberts ................ F01D 9/026
                                                                               415/191
2011/0103936 A1* 5/2011 Lombard ............... F01D 9/026
                                                                               415/145

\* cited by examiner

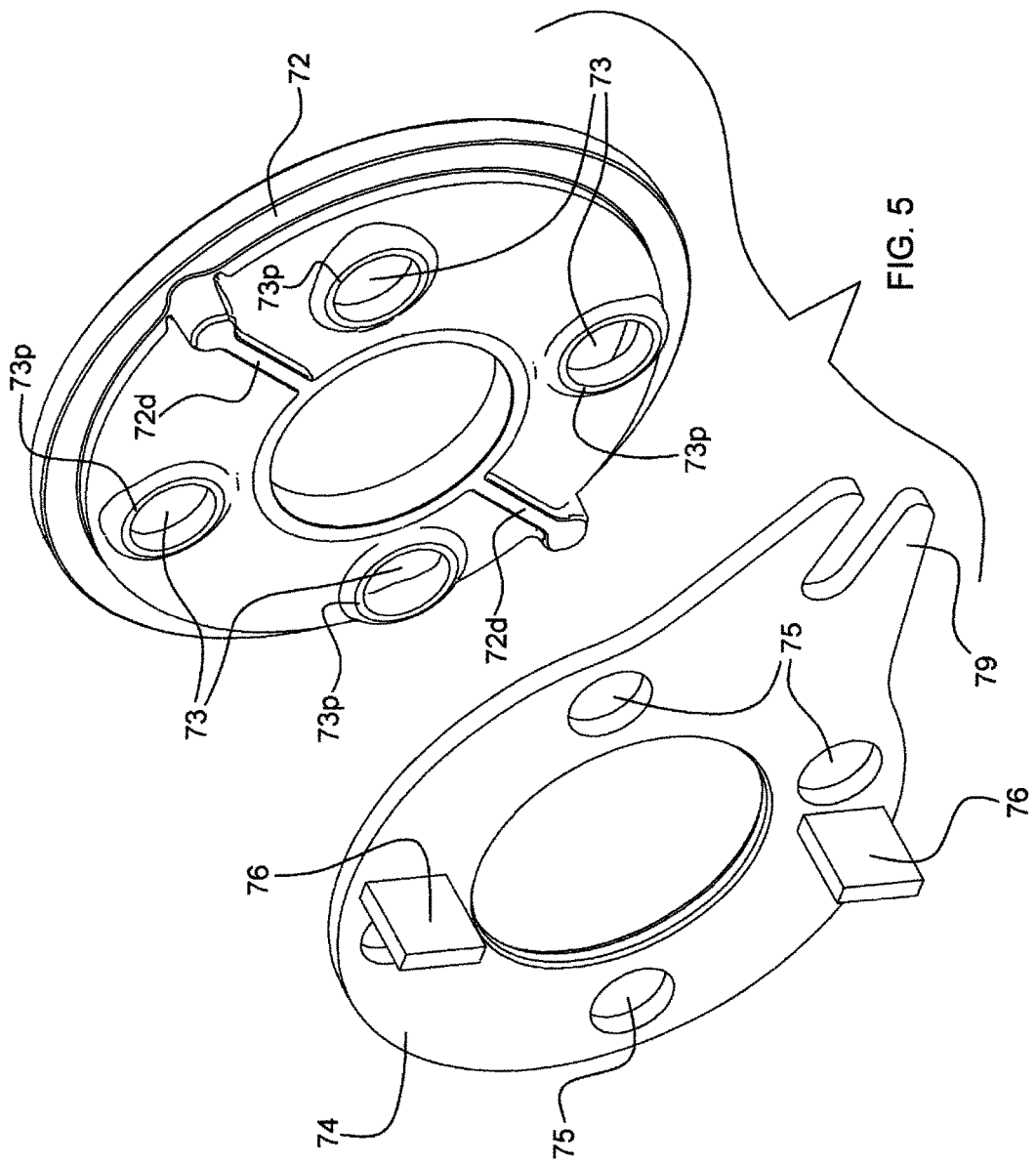

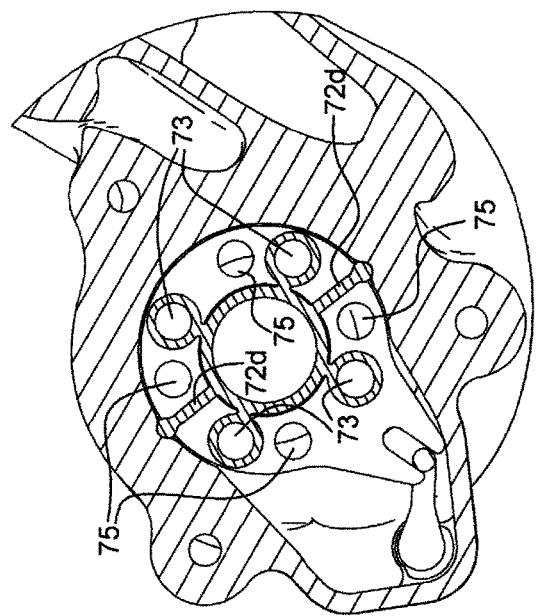
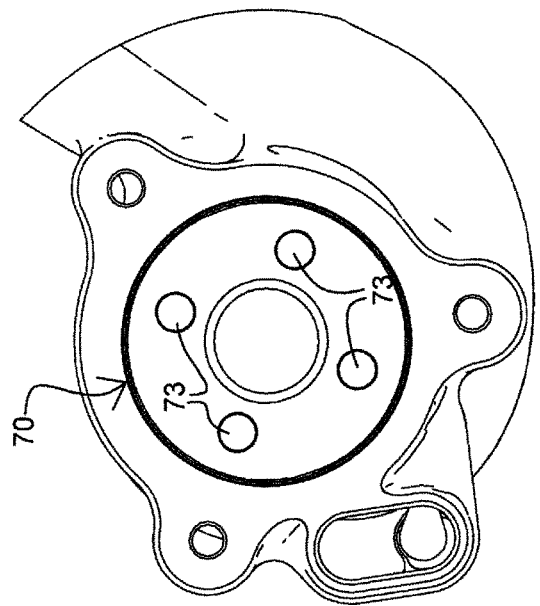
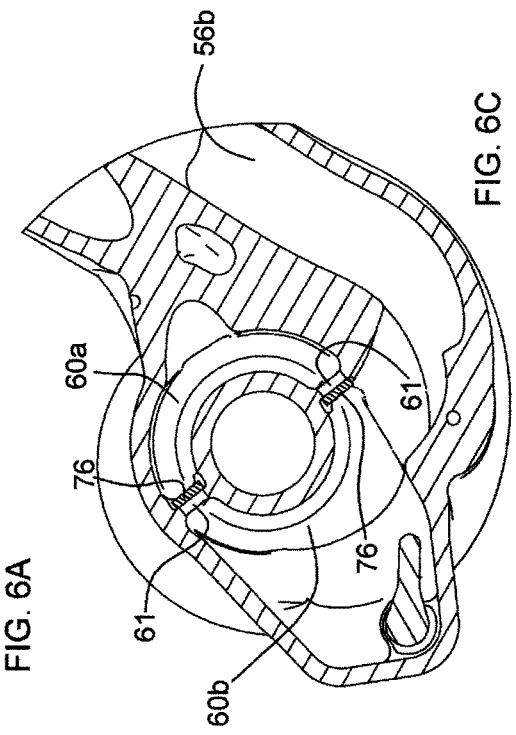
FIG. 6B
FIG. 6A
FIG. 6C

TURBOCHARGER WITH ROTARY BYPASS VALVE OPERABLE TO SELECTIVELY CONFIGURE THE TURBINE VOLUTE AS SINGLE-SCROLL OR TWIN-SCROLL

BACKGROUND OF THE INVENTION

The present disclosure relates to exhaust gas-driven turbochargers, and particularly to turbochargers having a twin-scroll turbine volute for preserving an advantageous exhaust gas pulse-effect at low engine speeds.

BRIEF SUMMARY OF THE DISCLOSURE

The present disclosure describes embodiments of a turbocharger that is selectively configurable in either a single-scroll or twin-scroll configuration, and the mechanism for switching between these configurations is integrated into an annular bypass valve for the turbine. In one embodiment described herein, a turbocharger comprises a compressor wheel mounted within a compressor housing, and a turbine housing defining a bore extending along a longitudinal axis and defining a sector-divided volute comprising first and second scrolls each occupying about 180 degrees of a full circumference about the longitudinal axis, the turbine housing further defining first and second exhaust gas inlets that are separate from each other and respectively feed exhaust gas into the first and second scrolls. A turbine wheel is disposed in the turbine housing. The turbine housing defines an annular bypass passage surrounding the bore and arranged to allow exhaust gas in the chamber to bypass the turbine wheel, wherein a portion of the annular bypass passage adjacent the first and second scrolls is sector-divided by a pair of dividing walls located within the bypass passage and respectively disposed on diametrically opposite sides of the bore, the dividing walls dividing the portion of the bypass passage into half-annular first and second bypass sectors. Each dividing wall defines a through-hole establishing fluid communication between the bypass sectors. The first scroll is connected to the first bypass sector to allow exhaust gas to pass from the first scroll to the first bypass sector, and the second scroll is connected to the second bypass sector to allow exhaust gas to pass from the second scroll to the second bypass sector.

An annular bypass valve is disposed in an annular portion of the bypass passage and operable when opened to allow exhaust gas to bypass the turbine wheel, the bypass valve comprising a fixed annular valve seat and an annular valve rotor that is disposed against the valve seat and is rotatable about the longitudinal axis. The valve seat defines a plurality of valve seat orifices extending axially therethrough and the valve rotor defines a plurality of valve rotor orifices extending axially therethrough, forming a plurality of orifice pairs each comprising a valve seat orifice and a corresponding valve rotor orifice, the orifices of the orifice pairs being arranged to overlap in some rotational positions of the valve rotor so as to create bypass flow passages formed by aligned portions of the valve seat orifices and valve rotor orifices.

The valve rotor includes a pair of valve members structured and arranged to respectively close the through-holes in the dividing walls in a fully closed rotational position of the valve rotor so as isolate the first and second bypass sectors from each other, the bypass flow passages also being closed in the fully closed position. In this configuration, separate streams of exhaust gas are fed to the first and second scrolls and remain separate up to the entrance to the turbine wheel.

The valve rotor is structured such that in a first intermediate position displaced from the fully closed position the valve members open the through-holes in the dividing walls so as to permit exhaust gas to flow between the first and second bypass sectors while the bypass flow passages remain closed. Accordingly, a portion of an exhaust gas pulse entering the first exhaust gas inlet into the first scroll can flow into the associated first bypass sector, through the dividing wall holes into the second bypass sector and from there into the second scroll and then to the turbine wheel. Although this secondary pathway to the turbine wheel is circuitous and not as efficient as the direct path from the first scroll to the wheel, it nevertheless establishes a secondary pathway that increases the total flow area to the turbine wheel. Likewise, a portion of an exhaust gas pulse into the second scroll can find a secondary pathway to the wheel via the second bypass sector to the first bypass sector and through to the first scroll and then to the wheel.

In a fully open position of the valve rotor displaced further from the first intermediate position, the through-holes in the dividing walls are fully open and the bypass flow passages are fully open.

Thus, by rotating the valve rotor to the first intermediate position, the turbine can be placed in a configuration that is effectively single-scroll, while the bypass valve remains closed to bypass flow. When it is desired to bypass exhaust gas, the valve rotor can be rotated to the fully open position.

In some embodiments, the valve rotor is rotatable to a second intermediate position, between the first intermediate position and the fully open position. The bypass flow passages are partially open in the second intermediate position. The valve can be configured to define a plurality of intermediate positions having varying degrees of openness of the bypass flow passages.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 5 is an exploded perspective view of a bypass valve sub-assembly for the turbine housing assembly of FIG. 2;

FIG. 6A is an axial end view of the turbocharger of FIG. 1 along line A-A, with the bypass valve in a fully closed position;

FIG. 6B is a cross-sectional view along line B-B in FIG. 1 with the bypass valve in the fully closed position;

FIG. 6C is a cross-sectional view along line C-C in FIG. 1 with the bypass valve in the fully closed position;

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
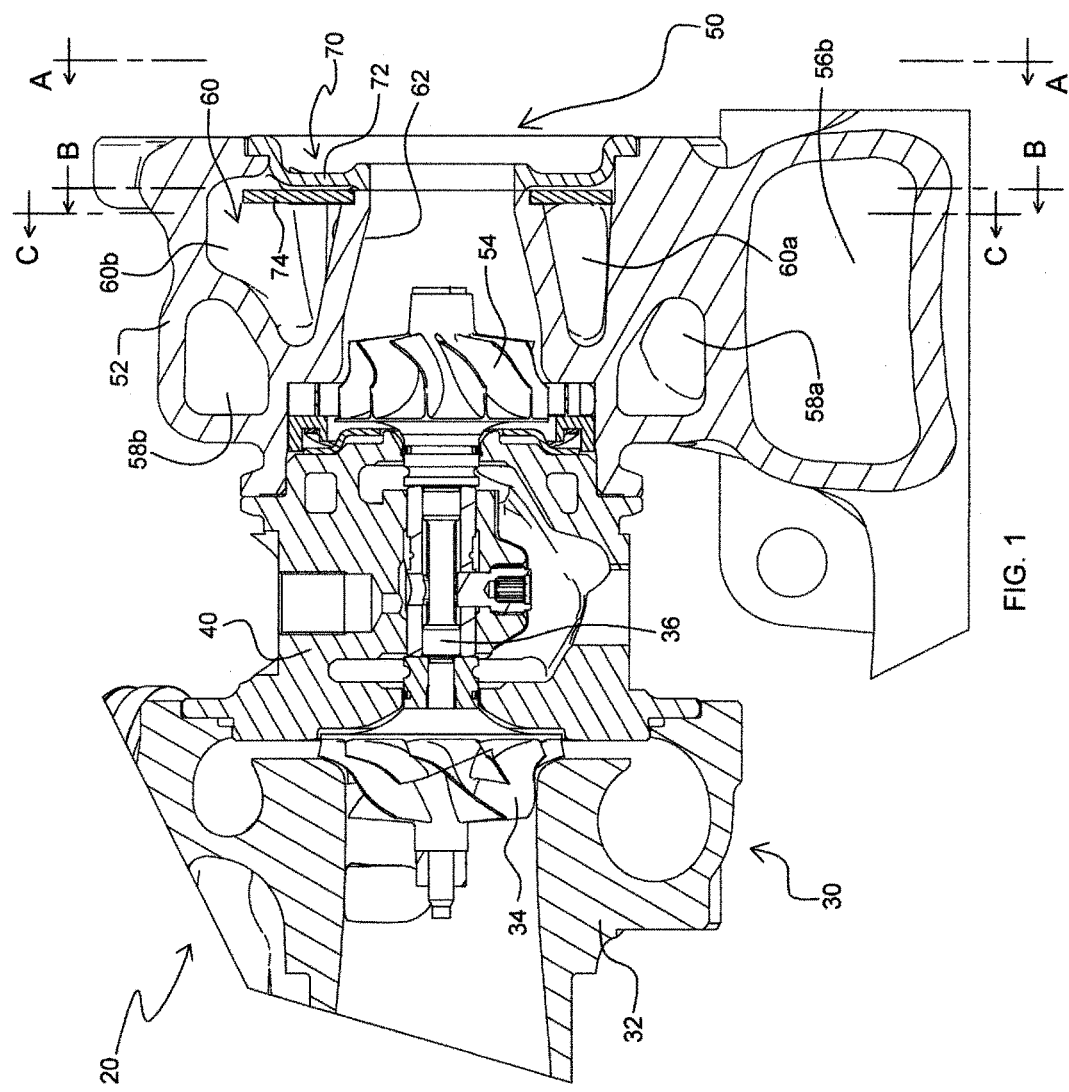
FIG. 1 is an axial cross-sectional view of a turbocharger in accordance with an embodiment of the invention.

A turbocharger 20 in which embodiments of the present invention may be employed is shown in FIG. 1. As shown, major sub-assemblies of the turbocharger 20 include a compressor assembly 30 and a turbine assembly 50. The compressor assembly 30 includes a compressor housing 32 and a compressor wheel 34 mounted therein and attached to one end of a rotary shaft 36. A center housing assembly includes a center housing 40 that is affixed to the compressor housing 32 and that contains bearings for the rotary shaft. The turbine assembly 50 includes a turbine housing 52 and a turbine wheel 54 mounted therein and attached to the opposite end of the rotary shaft.

The turbine housing 52 defines a pair of separate exhaust gas inlets 56a and 56b through which two separate streams of exhaust gas from an internal combustion engine are received, and a sector-divided volute or chamber that receives the exhaust gas streams from the inlets 56a,b and distributes the gas around the chamber for feeding into the turbine wheel 54. In accordance with the invention, the sector-divided chamber has a pair of substantially 180-degree chamber sectors, also referred to herein as first and second scrolls 58a and 58b, that are separate from each other. The first and second scrolls 58a and 58b are fed exhaust gas by the separate exhaust gas inlets 56a and 56b, respectively. As a non-limiting example, in the case of a 4-cylinder engine, cylinders 1 and 3 can feed exhaust gas to the inlet 56a and cylinders 2 and 4 can feed exhaust gas to the inlet 56b. Accordingly, when cylinder 1 is in the exhaust phase of its cycle and thus is feeding a pulse of exhaust gas to inlet 56a, cylinders 2 and 4 are not feeding exhaust gas to inlet 56b; then, when cylinder 2 is in its exhaust phase and thus is feeding a pulse of exhaust gas to inlet 56b, cylinders 1 and 3 are not feeding exhaust gas to inlet 56a; and so forth for all four cylinders. This alternating pulsing of inlets 56a and 56b, and thus the two scrolls 58a and 58b, with two separate streams of exhaust gas, advantageously is maintained up to as close to the turbine wheel inlet as possible in order to preserve the beneficial pulse effect on turbine efficiency particularly at low engine speeds and therefore low exhaust gas flow rates and low exhaust gas flow energy.

The scrolls 58a and 58b are also connected to a bypass volute 60 that includes a pair of substantially 180-degree bypass sectors 60a and 60b defined in the turbine housing 52. The first scroll 58a is connected only to the bypass sector 60a, and the second scroll 58b is connected only to the bypass sector 60b. The bypass sectors 60a,b collectively surround an axial bore 62 defined in the turbine housing, and are separated from each other by a pair of dividing walls 61 (best seen in FIG. 4) in the bypass volute, located diametrically opposite from each other. Exhaust gas that has passed through the turbine wheel 54 is exhausted from the turbine housing through the bore 62. The bypass sectors 60a,b provide an alternative pathway for exhaust gas to flow without first having to pass through the turbine wheel 54. The gas can flow through the bypass sectors 60a,b, however, only if the bypass valve described below is open.

Figure 2:
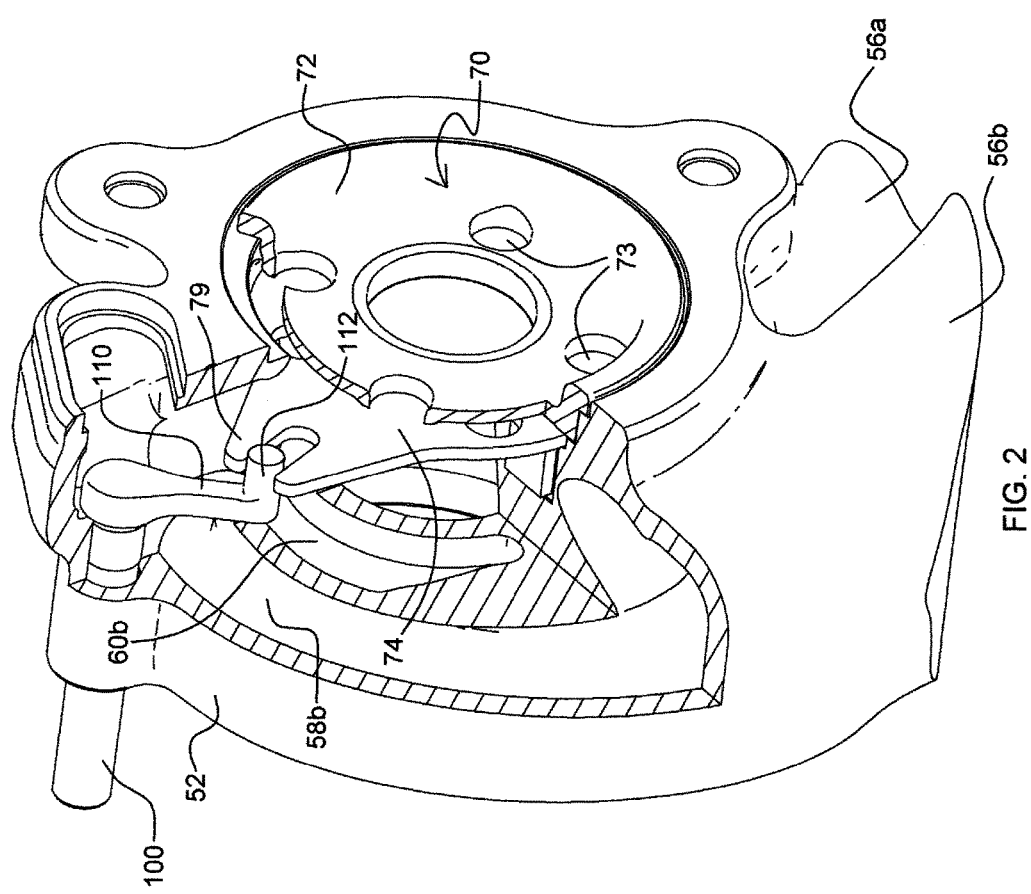
FIG. 2 is a perspective view of a turbine housing assembly for the turbocharger of FIG. 1, partially cut away to show internal details.
Figure 3:
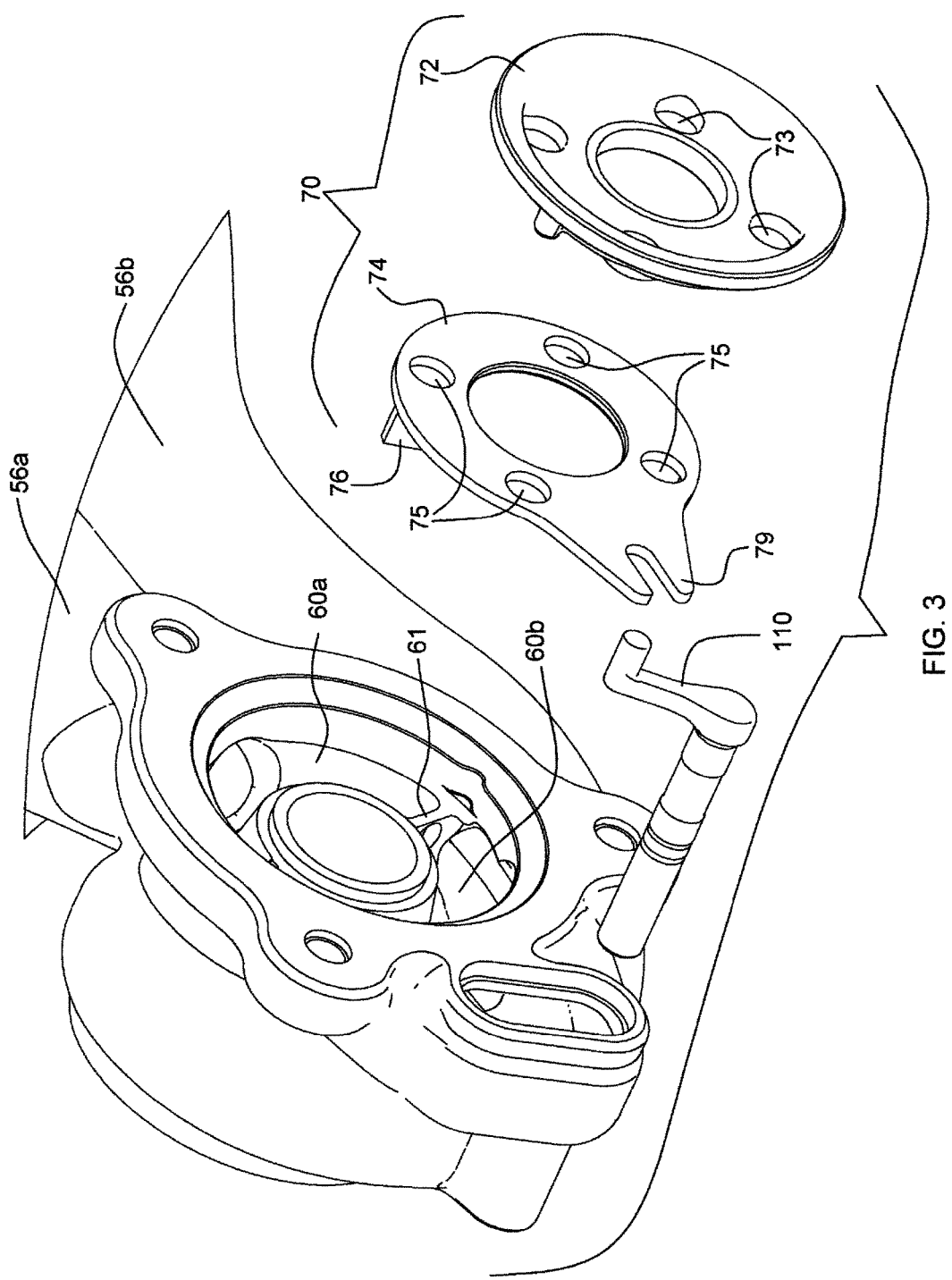
FIG. 3 is an exploded perspective view of the turbine housing assembly of FIG. 2.

With reference particularly to FIGS. 2 and 3, an annular bypass valve 70 is installed in a 360-degree annular portion of the bypass volute 60 that is just downstream of the two separate bypass sectors 60a,b. The bypass valve is operable for regulating flow through the bypass volute. The major components of the annular bypass valve 70 include a stationary valve seat 72 and a rotary valve rotor 74 in abutting engagement with the valve seat. The valve rotor 74 is constrained in the radial direction by the turbine housing but is free to rotate about its axis and to move axially against the valve seat 72. The valve seat 72 is prevented from moving axially, radially, or rotationally.

The valve seat 72 is a generally flat ring-shaped or annular member having a plurality of orifices 73 circumferentially spaced apart about a circumference of the valve seat, the orifices 73 extending generally axially between the upstream and downstream faces of the valve seat. The orifices 73 in the illustrated embodiment are uniformly spaced about the circumference of the valve seat, but as further described below, non-uniform spacing of the orifices is also possible and can be advantageous in some circumstances. The valve seat 72 can be formed by any of various processes and materials. For example, processes that can be used include casting, casting and machining, and stamping.

The rotary valve rotor 74 is a generally flat ring-shaped or annular member having a plurality of orifices 75 circumferentially spaced apart about a circumference of the valve seat, the orifices 75 extending generally axially between the upstream and downstream faces of the valve rotor. The orifices 75 in the illustrated embodiment are uniformly spaced about the circumference of the valve rotor, and the number and spacing of the orifices 75 in the valve rotor are the same as the number and spacing of the orifices 73 in the valve seat. However, as further described below, non-uniform spacing of the orifices 75 is also possible and can be advantageous in some circumstances; furthermore, the spacings of the orifices 73 and 75 do not have to be the same, and in some cases it can be advantageous for the spacings to be different.

With reference to FIG. 2, rotation of the valve rotor 74 is accomplished by a rotary drive arm 110 connected to a drive shaft 100 that rotates about its central axis (also called a "drive axis" herein), which is parallel to the rotation axis of the turbocharger. The drive arm 110 is generally "L"-shaped, having a portion that extends generally perpendicular to the drive axis, and a distal end (i.e., the end remote from the end that is connected to the drive shaft 100) that defines a pin or rod portion 112 that extends generally parallel to the drive axis. The valve rotor 74 includes a fork 79 that receives the pin portion 112 of the drive arm 110. The drive shaft 100 can be connected to a rotary actuator's output shaft (not shown)

to cause the drive shaft 100 to rotate and therefore the distal end of the drive arm 110 to sweep through an arc, thereby causing the valve rotor 74 to rotate about its longitudinal axis. Thus, rotation of the actuator in one direction will rotate the valve rotor in a first direction (opposite to that of the actuator), and rotation of the actuator in the other direction will cause the valve rotor to rotate in a second direction.

Figure 4:
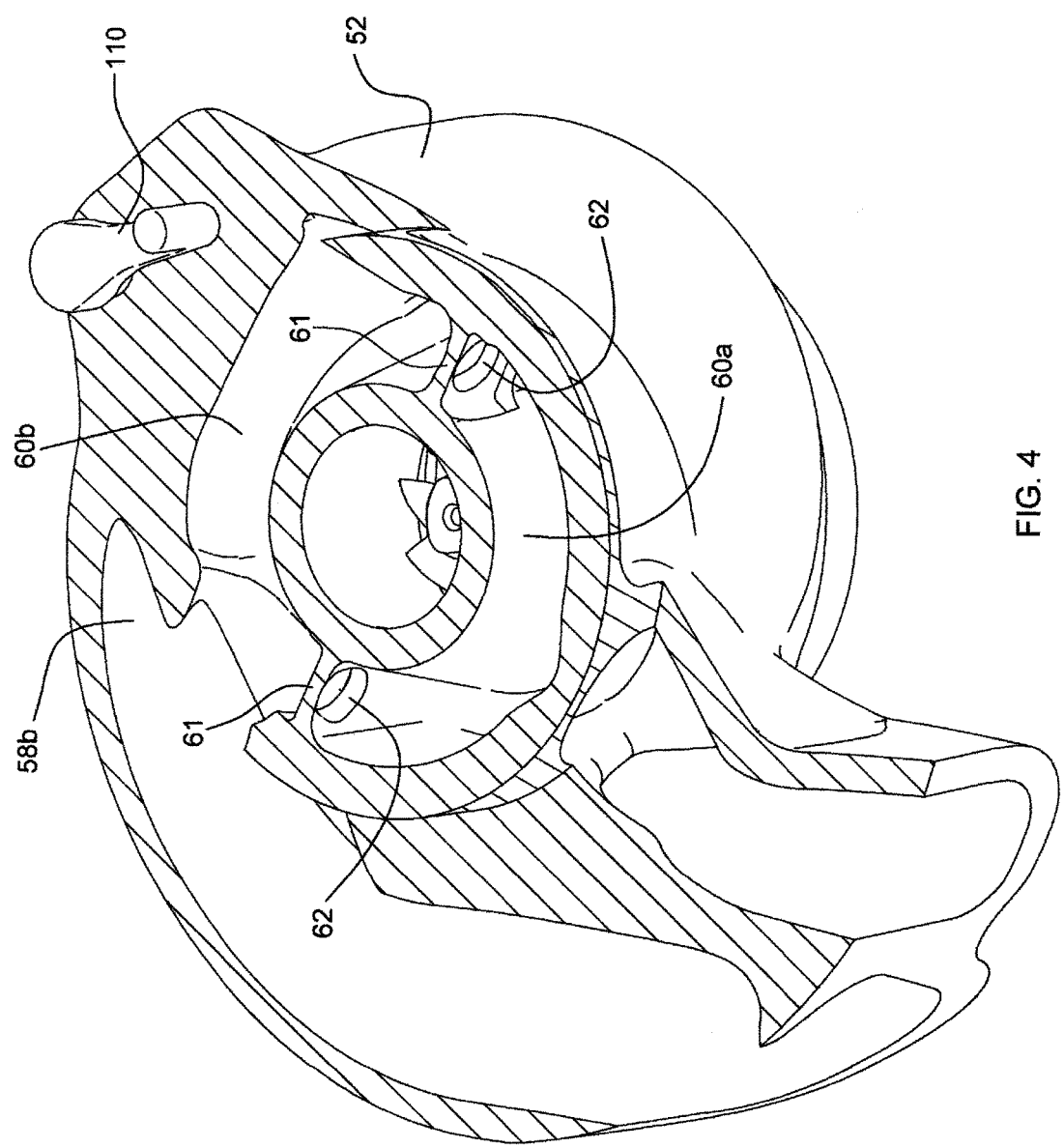
FIG. 4 is a sectioned perspective view of the turbine housing used in the assembly of FIG. 2.

With reference now to FIGS. 4 and 5, the dividing walls 61 that divide the portion of the bypass volute into the two bypass sectors 60a and 60b each have a hole 62 extending therethrough. Each of the dividing walls 61 lies substantially in (or more precisely parallel to) a radial-axial plane. The valve rotor 74 includes a pair of valve members 76 each projecting from the face of the valve rotor that is on the opposite side thereof from the valve seat 72. The valve members 76 project substantially in an axial direction from said face of the valve rotor and each lies substantially in (or more precisely parallel to) a radial-axial plane. The valve members 76 are located diametrically opposite from each other with respect to the central rotation axis of the valve rotor 74 and are positioned such that in one rotational position of the valve rotor as shown in FIG. 6C, one of the valve members 76 is abutting a face of one of the dividing walls 61 so as to effectively close the hole 62 and prevent gas flow therethrough, and the other valve member 76 is abutting the other dividing wall 61 so as to effectively close the hole 62 and prevent gas flow therethrough. Accordingly, when the valve rotor is in this position (FIG. 6C), the isolation of the two separate streams of exhaust gas is maintained through the two bypass sectors 60a and 60b. As explained further below, this is important for maintaining the advantageous pulse effect at low speeds and low exhaust gas energy conditions. In accordance with the invention, the holes 62 in the dividing walls can be opened so as to interconnect the two bypass sectors 60a and 60b by rotating the valve rotor 74 away from the FIG. 6C position, such as shown in FIGS. 7C, 8C, and 9C. A feature of the present invention is the timing of such opening of the dividing wall holes 62 with respect to the opening of the bypass valve 70. This is explained below.

With reference first to FIGS. 6A-6C, the turbine housing and bypass valve assembly are shown with the valve rotor 74 positioned in the closed position. As FIG. 6B indicates, the orifices 73 in the stationary valve seat 72 are completely misaligned with the orifices 75 in the valve rotor, such that there is no overlap therebetween. Accordingly, exhaust gas is prevented from passing through the bypass valve 70. As FIG. 6C shows, in this position, the valve members 76 on the valve rotor are positioned so as to close the dividing wall holes 62. As a result, exhaust gas pulses can be fed alternately to the two scrolls 58a and 58b and the isolation of the two gas streams from each other is preserved—that is, the bypass valve 70 substantially prevents leakage from one of the scrolls to the other one because the possible pathways for such leakage through the bypass valve orifices 73, 75 and the dividing wall holes 62 are closed off. In order to ensure such isolation, the valve seat 72 preferably includes two dams 72d as shown in FIG. 5. The dams 72d are raised ribs that project from the face of the valve seat 72 toward and into contact with the opposing face of the valve rotor 74. The dams are aligned with the dividing walls 61 so that one 180-degree sector of the valve seat bounded between the dams is aligned with the first scroll 58a and bypass sector 60a and the other 180-degree sector is aligned with the second scroll 58b and bypass sector 60b. In addition to the dams 72d, the valve seat preferably includes raised pads 73p that completely surround each of the orifices 73 and abut the face of the valve rotor so as to substantially prevent leakage of exhaust gas through the gap between the valve seat and valve rotor.

Figure 7A:
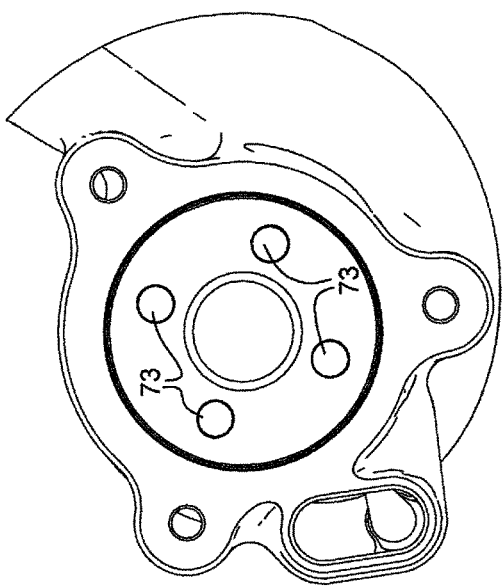
FIG. 7A is an axial end view of the turbocharger of FIG. 1 along line A-A, with the bypass valve in a first intermediate (partially open) position.
Figure 7B:
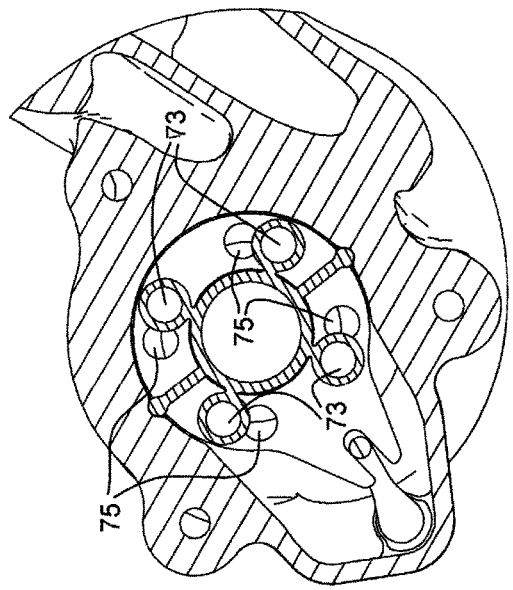
FIG. 7B is a cross-sectional view along line B-B in FIG. 1 with the bypass valve in the first intermediate position.
Figure 7C:
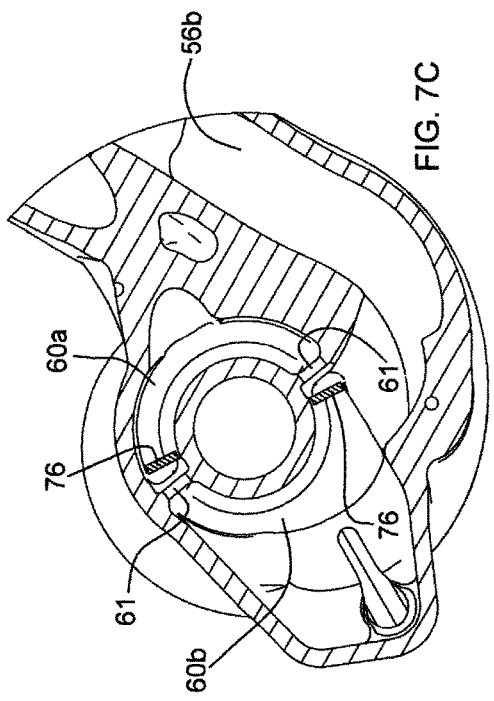
FIG. 7C is a cross-sectional view along line C-C in FIG. 1 with the bypass valve in the first intermediate position.

With reference to FIGS. 7A-7C, the bypass valve 70 is shown in a second position in which the valve rotor 74 is rotated sufficiently to open the dividing wall holes 62 so as to establish communication between the two bypass sectors 60a and 60b. However, as indicated in FIG. 7B, the valve rotor orifices 75 have still not begun to overlap with the valve seat orifices 73. Accordingly, the bypass valve 70 remains closed to bypass flow. The communication between the bypass sectors, however, establishes a flow path between the two scrolls 58a and 58b. Accordingly, a portion of the exhaust gas pulse entering the inlet 56a into the first scroll 58a can flow into the associated bypass sector 60a, through the dividing wall holes 62 into the other bypass sector 60b and from there into the second scroll 58b and then to the turbine wheel. Although this secondary pathway to the turbine wheel is circuitous and not as efficient as the direct path from the first scroll 58a to the wheel, it nevertheless establishes a secondary pathway that increases the total flow area to the turbine wheel. Likewise, a portion of an exhaust gas pulse into the second scroll 58b can find a secondary pathway to the wheel via the bypass sector 60b to the other bypass sector 60a and through to the first scroll 58a and then to the wheel.

Figure 8A:
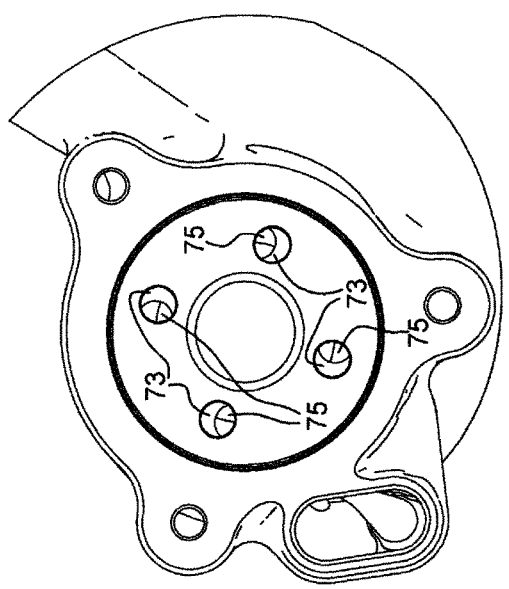
FIG. 8A is an axial end view of the turbocharger of FIG. 1 along line A-A, with the bypass valve in a second intermediate (further open) position.
Figure 8B:
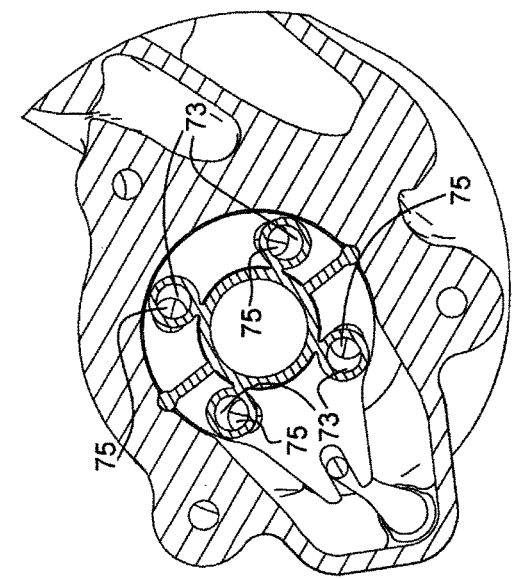
FIG. 8B is a cross-sectional view along line B-B in FIG. 1 with the bypass valve in the second intermediate position.
Figure 8C:
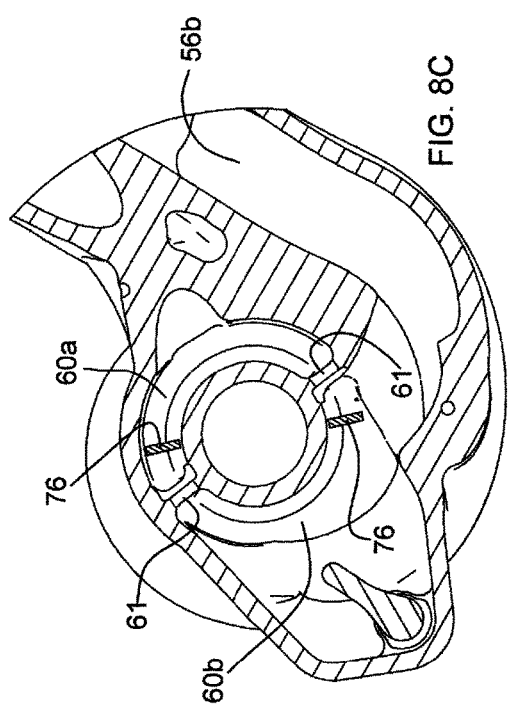
FIG. 8C is a cross-sectional view along line C-C in FIG. 1 with the bypass valve in the second intermediate position.

FIGS. 8A-8C illustrate a position of the valve rotor 74 rotated still further relative to the position of FIGS. 7A-C. In this further-rotated position, the valve rotor orifices 75 have begun to overlap with the valve seat orifices 73 but have not become fully aligned. Thus, in this partially open position of the bypass valve 70 some exhaust gas is able to flow through the bypass valve 70, bypassing the turbine wheel.

Figure 9B:
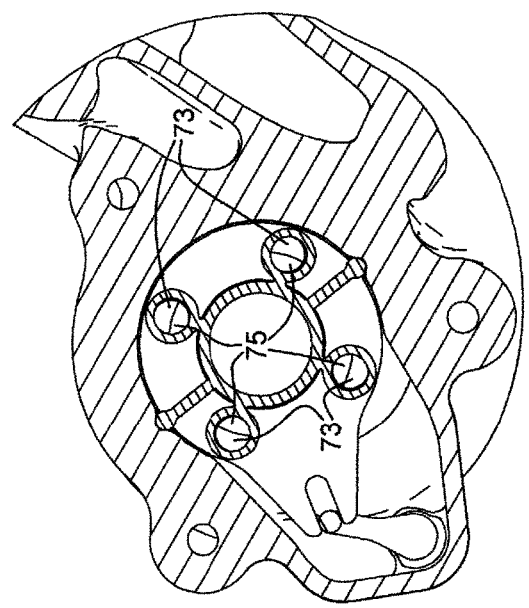
FIG. 9B is a cross-sectional view along line B-B in FIG. 1 with the bypass valve in the fully open position.
Figure 9A:
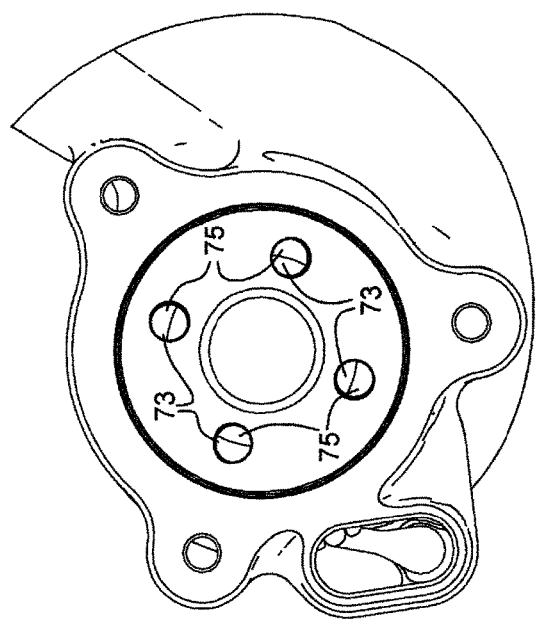
FIG. 9A is an axial end view of the turbocharger of FIG. 1 along line A-A, with the bypass valve in a fully open position.
Figure 9C:
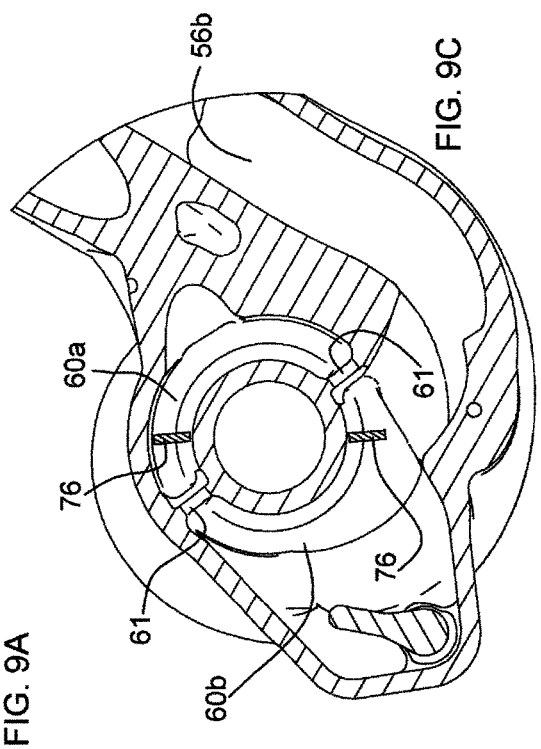
FIG. 9C is a cross-sectional view along line C-C in FIG. 1 with the bypass valve in the fully open position.

FIGS. 9A-9C illustrate a fully open position of the bypass valve in which there is maximum overlap between the valve rotor orifices 75 and the valve seat orifices 73.

In accordance with the invention, when engine speed is low and exhaust gas energy is correspondingly low, the bypass valve 70 can be placed in the fully closed position of FIGS. 6A-C. In this position, the two scrolls 58a,b are kept isolated from each other and the bypass sectors 60a,b are kept isolated from each other. Accordingly, the beneficial pulse effect on turbine stage efficiency for low speed operation is achieved because isolation of the two exhaust streams is maintained up to the turbine wheel.

On the other hand, when engine speed is higher, the isolation of the two scrolls is undesirable because the twin-scroll configuration penalizes turbine stage efficiency. In accordance with the invention, this penalty can be avoided or substantially mitigated by opening the bypass valve to the FIG. 7A-C position so that the total flow area for each of the exhaust gas pulses is substantially increased via the alternative pathway opened up by establishing scroll-to-scroll communication through the dividing wall holes 62. The turbine thus behaves similar to a single-scroll turbine.

At still higher engine speeds when bypassing of the turbine is desired for maximum exhaust gas flow rate, the bypass valve can be opened to the partially open FIG. 8A-C position or the fully open FIG. 9A-C position.

Many modifications and other embodiments of the inventions set forth herein will come to mind to one skilled in the art to which these inventions pertain having the benefit of the teachings presented in the foregoing descriptions and the associated drawings. For example, in the embodiment illustrated and described herein, the through-holes in the dividing walls become fully open before the bypass flow passages begin to open. Alternatively, however, other embodiments are included in the scope of the invention in which different scroll-to-scroll versus bypass opening schemes are employed. For instance, the bypass passages can begin to open before the scroll-to-scroll through-holes are fully opened. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger comprising:
    a compressor wheel mounted within a compressor housing;
    a turbine housing defining a bore extending along a longitudinal axis and defining a sector-divided volute comprising first and second scrolls each occupying 180 degrees of a full circumference about the longitudinal axis, the turbine housing further defining first and second exhaust gas inlets that are separate from each other and respectively feed exhaust gas into the first and second scrolls;
    a turbine wheel disposed in the turbine housing;
    the turbine housing defining an annular bypass passage surrounding the bore and arranged to allow exhaust gas in the chamber to bypass the turbine wheel, wherein a portion of the annular bypass passage adjacent the first and second scrolls is sector-divided by a pair of dividing walls located within the bypass passage and respectively disposed on diametrically opposite sides of the bore, the pair of dividing walls dividing the portion of the bypass passage into half-annular first and second bypass sectors, each of the pair of dividing walls defining a through-hole establishing fluid communication between the bypass sectors, wherein the first scroll is connected to the first bypass sector to allow exhaust gas to pass from the first scroll to the first bypass sector, and the second scroll is connected to the second bypass sector to allow exhaust gas to pass from the second scroll to the second bypass sector;
    an annular bypass valve disposed in an annular portion of the bypass passage and operable when opened to allow exhaust gas to bypass the turbine wheel, the bypass valve comprising a fixed annular valve seat and an annular valve rotor that is disposed against the valve seat and is rotatable about the longitudinal axis, the valve seat defining a plurality of valve seat orifices extending axially therethrough and the valve rotor defining a plurality of valve rotor orifices extending axially therethrough, forming a plurality of orifice pairs each comprising a valve seat orifice and a corresponding valve rotor orifice, the orifices of the orifice pairs being arranged to overlap in some rotational positions of the valve rotor so as to create bypass flow passages formed by aligned portions of the valve seat orifices and valve rotor orifices,
    wherein the valve rotor includes a pair of valve members structured and arranged to respectively close the through-holes in the dividing walls in a fully closed rotational position of the valve rotor so as isolate the first and second bypass sectors from each other, the bypass flow passages also being closed in the fully closed position,
    wherein the valve rotor is structured such that in a first intermediate position displaced from the fully closed position the through-holes begin to open so as to permit exhaust gas to flow between the first and second bypass sectors while the bypass flow passages remain closed, and such that in a fully open position displaced further from the first intermediate position the through-holes are fully open and the bypass flow passages are fully open.

2. The turbocharger of claim 1, wherein the valve rotor is rotatable to a second intermediate position, between the first intermediate position and the fully open position, and wherein the bypass flow passages are partially open in the second intermediate position.

3. The turbocharger of claim 1, wherein the valve seat includes a pair of raised ribs projecting from the valve seat and abutting an opposing face of the valve rotor, the ribs being aligned with the dividing walls for preventing leakage of exhaust gas between the first and second scrolls via the bypass valve.

4. The turbocharger of claim 3, wherein the valve seat includes a raised pad surrounding each valve seat orifice, the raised pads projecting from the valve seat and abutting the opposing face of the valve rotor for preventing leakage of exhaust gas between the first and second scrolls via the bypass valve.

* * * * *